United States Patent [19]
Casale et al.

[11] 4,380,246
[45] Apr. 19, 1983

[54] BUTTERFLY VALVE AND METHOD OF MAKING SAME

[75] Inventors: Thomas M. Casale, Arlington Heights; Frederick J. Schmitz, Jr., Chicago; Victor Pauperas, Oak Lawn, all of Ill.

[73] Assignee: Dayco Corporation, Dayton, Ohio

[21] Appl. No.: 245,844

[22] Filed: Mar. 20, 1981

[51] Int. Cl.³ .............................................. F16K 1/22
[52] U.S. Cl. .................................... 137/375; 137/340; 251/308
[58] Field of Search ................ 251/214, 308; 137/375, 137/340

[56] References Cited
U.S. PATENT DOCUMENTS 3,837,356 9/1974 Selep et al. ........................... 137/375
4,079,747 3/1978 Roberts ................................. 137/375
4,308,805 1/1982 Spater .................................. 137/375

Primary Examiner—Martin P. Schwadron
Assistant Examiner—James R. Shay
Attorney, Agent, or Firm—Fitch, Even, Tabin, Flannery & Welsh

[57] ABSTRACT

A butterfly valve for controlling flow therethrough of a high temperature fluid and method of making same are provided wherein such valve comprises an outer metal housing, a ceramic lining carried by the housing and defining a fluid flow passage through the valve, a valve closure member, a rotatable shaft fixed to the member, and means rotatably supporting the shaft on the housing to enable rotation of the member within the flow passage from an open to a closed position to open and close the flow passage, and wherein the member is made of a ceramic material and the shaft is embedded substantially centrally between opposed surfaces of the member.

3 Claims, 8 Drawing Figures

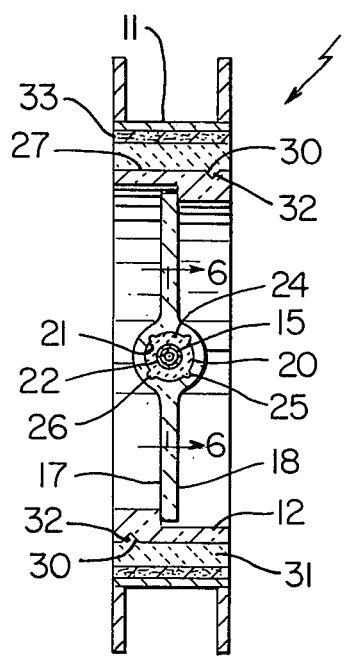
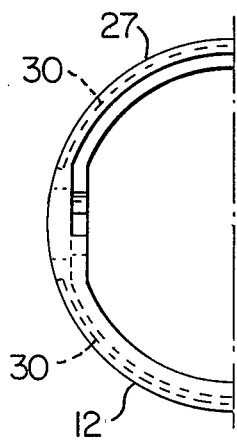
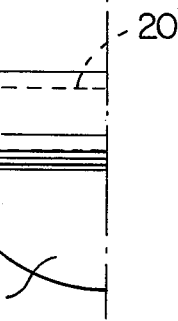
FIG. 3  FIG. 4  FIG. 5
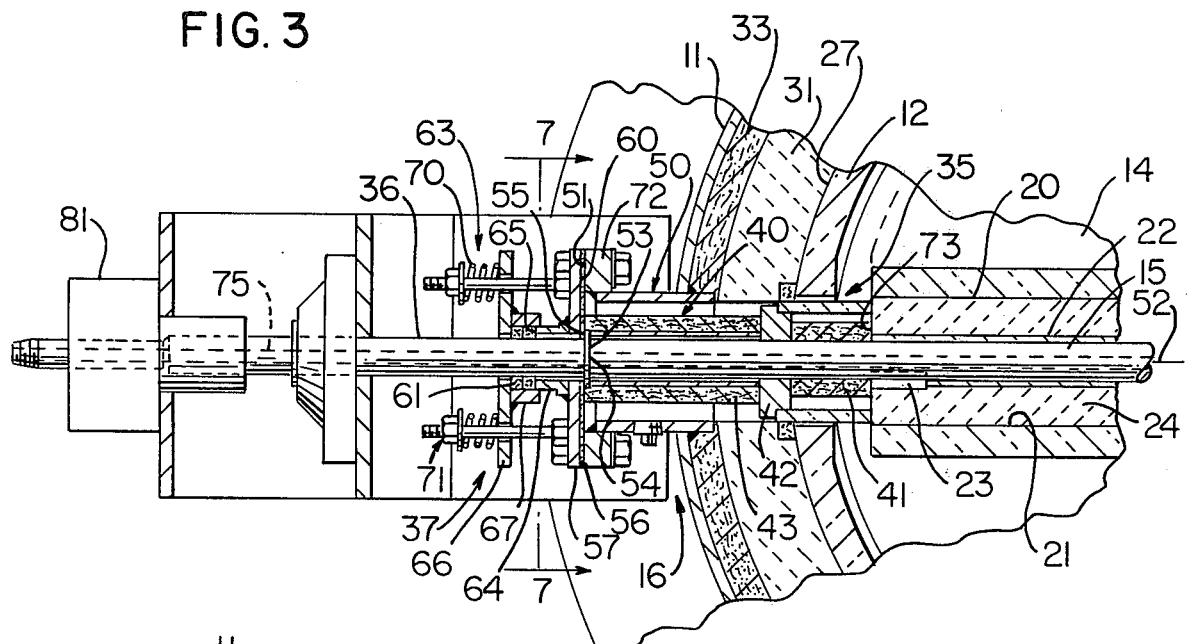
FIG. 6
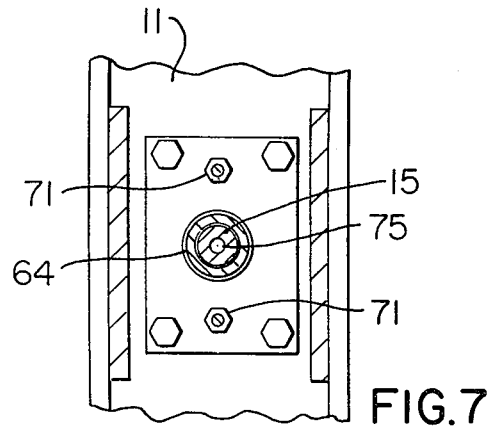
FIG. 7
FIG. 8

4,380,246

BUTTERFLY VALVE AND METHOD OF MAKING SAME

BACKGROUND OF THE INVENTION

1. Field of the Invention

This invention relates to a butterfly valve for controlling flow therethrough of a high temperature fluid and to a method of making such a valve.

2. Prior Art Statement

Butterfly valves are well known in the art and are used in numerous applications to control the flow of various fluids therethrough. Also, in applications such as electrical power generating stations, refineries, and the like, the need exists for such valves which are capable of operating for long periods of time while controlling high temperature fluids flowing therethrough. In the above applications, such butterfly valves may be of comparatively large size, often having an effective flow diameter of several feet, and even larger.

It is also known in the art to provide a butterfly valve for controlling flow of fluid therethrough wherein the valve comprises an outer metal housing, a ceramic lining carried by the housing and defining a fluid flow passage through the valve, a valve closure member, a rotatable shaft fixed to the member, and means rotatably supporting the shaft on the housing to enable rotation of the member within the flow passage from an open to a closed position to open and close the flow passage.

However, the butterfly valves which have been proposed heretofore to control the flow of fluids therethrough wherein such fluids are at elevated temperatures generally of the order of 2,500° F. have various deficiencies. One deficiency with each of such valves is that the valve closure member thereof tends to be eroded and/or corroded by the high temperature fluid flowing therethrough. Another deficiency is the tendency for the supporting portions of the closure member to fail prematurely due to the high temperatures. Another deficiency is that each of such valves requires substantial cooling using coolants, such as, water, air, steam, and the like, in order to assure satisfactory operation. Another deficiency is the failure of previous valves because metal components thereof are not effectively isolated and thermally insulated.

It is an object of this invention to provide an improved butterfly valve capable of operating at elevated temperatures of the character mentioned for an extended service life.

Another object of this invention is to provide an improved method of making such a butterfly valve.

Other aspects, embodiments, objects, and advantages of this invention will become apparent from the following specification, claims, and drawings.

SUMMARY

In accordance with the present invention there is provided an improved butterfly valve which overcomes the above-mentioned deficiencies. The improved butterfly valve comprises an outer metal housing, a ceramic lining carried by the housing and defining a fluid flow passage through the valve, a valve closure member, a rotatable shaft fixed to the member, and means rotatably supporting the shaft on the housing to enable rotation of the member within the flow passage from an open to a closed position to open and close the flow passage.

In accordance with one embodiment of this invention the valve closure member of the butterfly valve is made of a ceramic material and the shaft is embedded substantially centrally between opposed surfaces of the member.

Also provided in accordance with this invention is an improved method of making a butterfly valve of the character mentioned.

BRIEF DESCRIPTION OF THE DRAWINGS

The accompanying drawings show present preferred embodiments of this invention, in which

FIG. 3 is a cross-sectional view taken essentially on the line 3—3 of FIG. 2;

FIG. 4 is an end view of one-half of a ceramic lining which comprises the valve of FIG. 1;

FIG. 5 is a view similar to FIG. 4 of the corresponding portion of a closure member of the valve of FIG. 1;

FIG. 6 is a greatly enlarged view with parts in cross section, parts in elevation, and parts broken away taken essentially on the line 6—6 of FIG. 3;

FIG. 7 is a view taken essentially on the line 7—7 of FIG. 6; and

FIG. 8 is a fragmentary view similar to the central portion of FIG. 7 showing a modification of the valve which employs a solid rotatable support shaft for its closure member.

DETAILED DESCRIPTION

Figure 1:
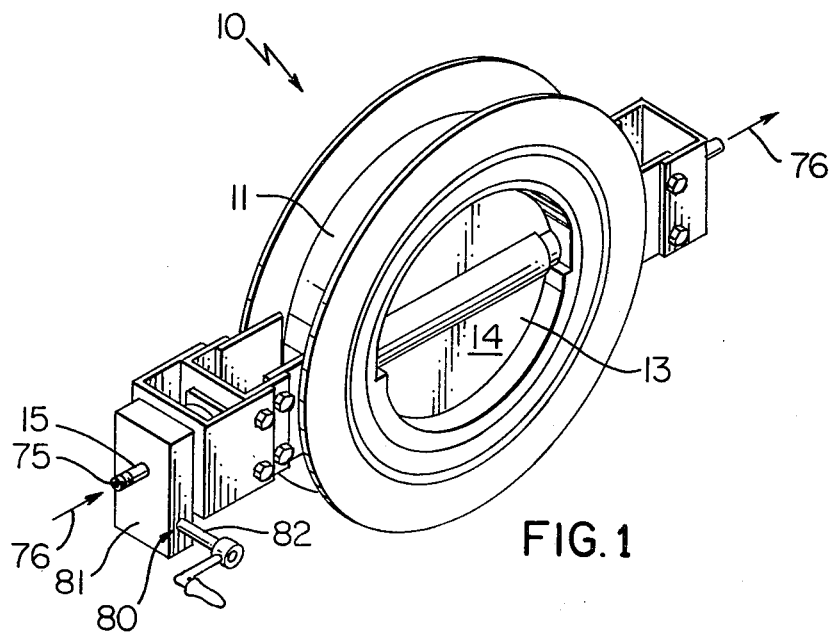
FIG. 1 is an isometric view of one exemplary embodiment of a butterfly valve of this invention shown in a closed position.

Reference is now made to FIG. 1 of the drawings which illustrates one exemplary embodiment of a butterfly valve of this invention which is designated generally by the reference numeral 10. The valve 10 is particularly adapted to control the flow therethrough of high temperature fluids and the construction thereof enables such valve to control fluids having temperatures generally of the order of 2,500° F. The construction of the valve 10 minimizes or eliminates the use of cooling fluids to assure satisfactory valve operation at temperatures of the magnitudes mentioned by using certain non-metallic materials and by employing such materials to effectively isolate and thermally insulate structural metal portions of the valve. The non-metallic materials include ceramic materials which have great strength at the high temperatures mentioned and such ceramic materials also have great resistance to abrasion and corrosion of the types ordinarily caused on metal valve components by high temperature fluids.

Figure 2:
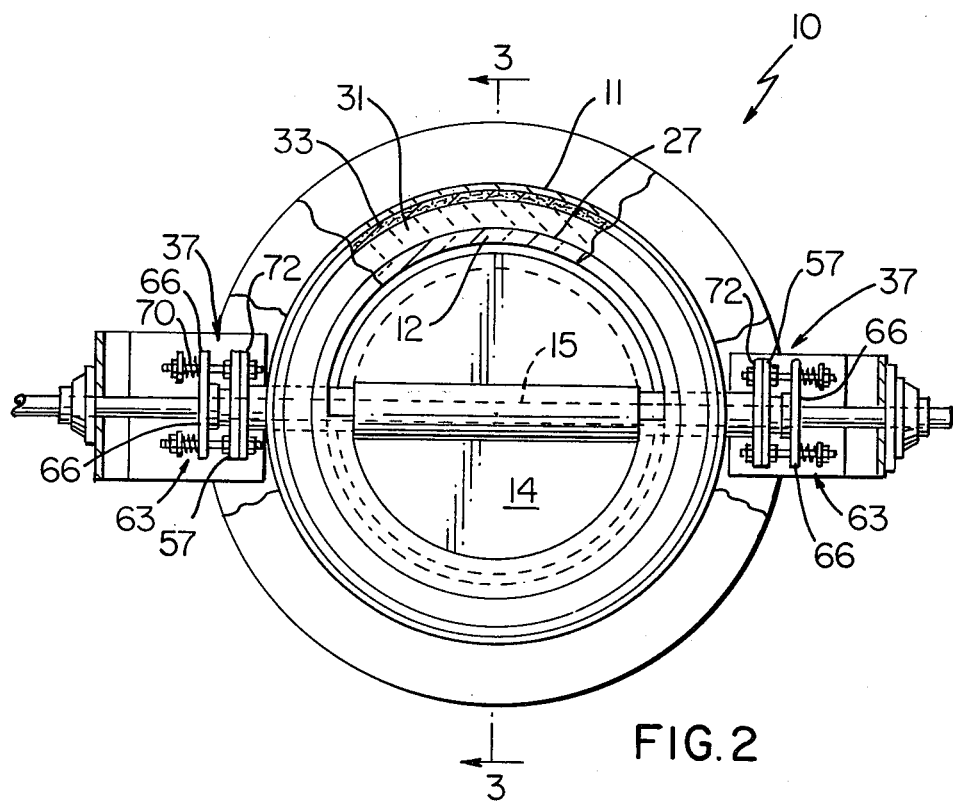
FIG. 2 is a showing of the closed valve of FIG. 1, with parts in cross section and parts broken away, as viewed from one end thereof in a direction parallel to the central axis of the flow passage through the valve.

The valve 10 comprises an outer metal housing 11 and a ceramic lining 12 carried by the housing and defining a flow passage 13 through the valve. The valve 10 also comprises a closure member 14 and a rotatable shaft 15 (FIGS. 2 and 6) fixed to the member 14. The valve 10 also has means, indicated generally at 16 in FIG. 6 for one side of such valve, rotatably supporting the shaft 15 on the housing 11 and its adjoining components to enable rotation of the member 14 within the flow passage 13 from an open to a closed position and thereby open and close such flow passage. In the drawing presentation of FIGS. 1–3 the closure member 14 is shown in its closed position.

The closure member is made of a ceramic material; and, such closure member is capable of withstanding and operating successfully with fluids at temperatures of roughly 2,500° F. flowing through the valve 10. The ceramic material used to make such closure member 14 is preferably silicon carbide and has high resistance to both erosion and corrosion of the character mentioned.

As seen in FIGS. 1 and 3 of the drawings, the flow passage 13 is a substantially right circular cylindrical passage; and, the closure member is a disc of substantially circular outline with the shaft 15 being embedded on a diametral line of the disc 14. The shaft 15 is a metal shaft which is embedded substantially centrally between opposed surfaces 17 and 18 of such member; and, various components are interposed between the metal shaft 15 and the ceramic closure member 14 for the purposes of isolating and protecting such shaft as well as fixing the shaft 15 to the ceramic member 14 in a high strength manner as will now be described.

The member 14 has a roughly cylindrical diametral opening 20 (FIG. 3) therethrough which defines a corresponding cylindrical inside surface 21. The valve 10 further comprises a tubular metal sleeve 22 which is disposed concentrically around the shaft 15; and, as best seen in FIG. 6, a key 23 is provided to connect the sleeve 22 and shaft 15 while preventing relative rotation therebetween. The key 23 is received within cooperating grooves in the shaft 15 and sleeve 22 as is known in the art.

To assure that the ceramic closure member 14 is held in position in a high strength manner on its shaft 15, a refractory material 24 is provided and disposed between the outside surface of the sleeve 22 and the inside surface 21. The material 24 serves as a supporting structure and also fixes the member 14 to the sleeve 22 and hence shaft 15. The member 14 has a plurality of angularly spaced rectilinear grooves 25 therein and in this example of the invention such grooves are spaced roughly 90° apart. The rectilinear grooves 25 extend radially outwardly from the cylindrical inside surface 21 and the refractory material 24 has integral portions 26 thereof disposed within the rectilinear grooves 25 which help hold the member 14 and refractory material 24 together as a unitary structure.

The ceramic lining 12 is preferably a silicon carbide lining which is made independently of the outer housing 11 and such lining has an outside surface 27 which will be readily apparent from FIGS. 3 and 4. A plurality of axially spaced grooves are provided in the lining 12 and in this example of the invention a plurality of two grooves, each designated by the same reference numeral 30, are provided. Each groove 30 is of roughly semicircular outer outline and of V-shaped cross section and extends radially inwardly from the outside surface 27 into the lining 12.

The valve 10 also comprises a thickness or layer of refractory material 31 which is disposed against the outside surface 27 with portions 32 of the refractory material 31 in the axially spaced grooves 30. The portions 32 help hold the lining 12 and the refractory material 31 together as a unitary structure.

The valve 10 also comprises what will be referred to as a thermal insulating material 33 (FIG. 6) and the material 33 is disposed between thickness of refractory material 31 and the metal housing 11. The insulating material 33 is for the purpose of providing thermal insulation and also structurally supports those portions of the valve 10 disposed inwardly of the valve housing 11. The material 33 may be any suitable material and in this example a so-called ceramic fiber is preferably employed which is capable of withstanding temperatures of the order of 2,300° F. One fiber which has been used successfully is sold by the Carborundum Company of Keasbey, N.J. and sold under the trade designation of FABERFRAX.

The valve 10 also comprises two sets, with each set being designated by the same reference numeral 35, of aligned openings in the metal housing 11, thermal insulating material 33, refractory material 31, and ceramic liner 12 and the two sets 35 are at diametrically opposed positions on the valve 10. The shaft 15 also has opposite end portions, with each end portion being designated generally by the reference numeral 36; and, each end portion 36 extends through a set 35 of aligned openings and outwardly of the metal housing 11. A set 35 of aligned openings at only one side of the valve 10 is shown in FIG. 6 with it being understood that a substantially identical set is provided at the opposite side of such valve.

The valve 10 also has a support and seal assembly, designated generally by the reference numeral 37, for each of the end portions 36 of the shaft 15. Each assembly 37 serves to support its shaft end portion 36 while preventing leakage out of said valve of fluid flowing in the flow passage 13. Only the assembly 37 at the left hand side of the valve 10 is shown in FIG. 6 and because such assembly is identical to the right hand assembly a detailed description will only be made of such left hand assembly and is fully applicable to both the left hand and right hand assemblies 37.

The assembly 37 comprises an internal lubricant retaining and fluid seal structure 40. The internal structure 40 is comprised of a plurality of tubular components supported concentrically around the shaft 15 and in axially aligned end-to-end relation. The components of the internal structure comprises a seal member 41 against the member 15, a structural sleeve guide 42 disposed against the outer end of member 41, and a fiber sleeve 43 disposed against the outer end of guide 42 and around a pipe equal in axial length to the sleeve 43.

The assembly 37 comprises a tubular flange structure 50 fixed at its inner end in sealed relation to the housing 11 and the structure 50 has a planar outermost surface 51 which is disposed perpendicular to a central longitudinal axis 52 of the shaft 15. An annular groove 53 is provided in each of the shaft end portions 36 and a snap ring 54 is disposed in each groove 53. The snap ring 54 has an outside diameter which is greater than the outside diameter of its shaft end portion 36 thereby defining a corresponding annular portion 55 thereof. Each groove 53 and snap ring 54 have associated outer surfaces disposed substantially coplanar with the planar surface 51.

The assembly 37 also comprises a high temperature gasket 56 covering the planar surface 51 and annular portion 55 of the snap ring 54. The gasket 56 has a central bore therein which defines a right circular cylindrical surface disposed in sealed relation against the outside surface of its associated shaft end portion 36.

The assembly 37 also comprises an annular plate structure 57 which is disposed axially outwardly of the gasket 56 along its shaft end portion 36 and the plate structure 57 has a gasket-engaging surface 60 sandwiching such gasket against the planar surface 51. The assembly 37 also comprises high temperature packing ring means shown as a plurality of two high temperature packing rings, each designated by the same reference numeral 61, disposed in sealed relation concentrically around and against the outside surface of its associated shaft end portion 36. A spring assembly 63 is provided and yieldingly urges the packing rings 61 in sealed relation against the annular plate structure 57.

The annular plate structure 57 has a tube 64 extending outwardly in sealed relation from the side thereof opposite its gasket engaging surface 60. The tube 64 is disposed concentrically around its shaft end portion 36 and has a sealing end edge 65.

The spring assembly 63 comprises an urging disc 66 which has a central bore therethrough which is slightly larger in diameter than the outside diameter of its shaft end portion 36 and a support sleeve 67 is fixed to the urging disc 66. The support sleeve 67 has an inside diameter which is larger than the outside diameter of the tube 64 whereby an end portion of the tube 64 is received within the sleeve 67 with the packing ring means or packing rings 61 confined by the sleeve 67, shaft end portion 36, urging disc 66, and sealing end edge 65 of the tube 64.

The spring assembly 63 also comprises a plurality of springs 70 which serve to yieldingly urge the disc 66 and hence the packing rings 61 in sealed engagement against the sealing end edge 65. The springs 70 may be of any suitable type; however, in this example of the invention, such springs are mechanical compression springs which are shown in a compressed condition. Each spring 70 is held in its compressed condition by an associated threaded bolt and nut assembly 71 which is supported by a flange portion 72 of the tubular flange structure 50.

The previously described internal seal structure 40 of the seal assembly 37 is comprised of the previously described axially aligned adjoining member or components 41-43. The outer member 43 has its outer end edge disposed in sealed relation against the gasket 56. The inner member 41 has its inner end edge disposed against a surface 73 defined by coplanar annular portions of the refractory material 24 and metal sleeve 22 defining the inner portions of the disc 14. Each internal structure 40 cooperates with the remaining portion of its assembly 37 to prevent leakage of high temperature fluid out of the flow passage 13 of the valve along the associated end 36 of shaft 15.

The shaft 15 is a tubular metal shaft which is preferably made of stainless steel and has an axial opening 75 therethrough and as shown in FIG. 7. The valve 10 of this example comprises means for flowing a cooling fluid (FIG. 1) through the shaft and such means is designated schematically by a pair of arrows 76 and the cooling fluid may be cooling water, steam, or other suitable fluid. The cooling fluid is for the purpose of cooling the shaft and adjoining portions of the disc 14 whereby the cooling fluid cools the shaft 15, sleeve 22, and key 23 and provides cooling action for the refractory material 24 and adjoining portions of the ceramic closure member 14 in the vicinity of the refractory material 24. By keeping all of these components comparatively cool compared to the 2,500° F. gas flowing through the valve 10, the structural integrity of such components is maintained and the closure member may be cycled numerous times without failure.

It will also be appreciated that the shaft need not necessarily be a tubular shaft which is provided with means for flowing a cooling fluid therethrough. To highlight this point FIG. 8 illustrates a fragmentary portion of a modification of the valve viewed in cross section at a location where the shaft 15 passes through tube 64 and such shaft is shown as being a solid metal shaft. The solid shaft 15 is also made preferably of stainless steel and in applications where the solid shaft is used the valve is generally used to handle fluids having temperatures less than 2,500° F. and generally at temperatures of the order of 2,000° F.

The outer housing 11 may be made of any suitable metal capable of withstanding elevated temperatures. In this example of the invention the housing 11 is also preferably made of stainless steel.

The valve 10 has means for rotating the shaft 15 to thereby rotate the valve member 14 between its open and closed positions and such rotating means in this example of the invention is designated generally by the reference numeral 80. The rotating means 80 comprises a suitable gear assembly 81 and a manual crank 82 which operates through the asembly 81 to rotate the shaft 15 and valve 14. However, it will be appreciated that the rotating means may be in the form of power driven means such as a drive motor (not shown) which also operates through the gear assembly 81.

As indicated earlier the closure member 14 and the sleeve 12 are both preferably made of silicon carbide and the detailed configurations of these components have been made successfully by the Carborundum Company, of Keasbey, N.J. Each of these components 12 and 14 is made as an independent component by disposing flowable silicon carbide in a suitable mold device and allowing same to set to define a so-called green or uncured component. The uncured component is then placed in a high temperature curing furnace to complete same. After cooling the completed component is used to build up the valve 10.

Reference has also been made herein to the use of refractory material 24 and 31. The preferred refractory material is comprised primarily of $Al_2O_3$, $SiO_2$ and $CaO$ and is referred to as a Class Q insulating castable refractory which has exceptionally high strength at elevated operating temperatures, of the order of 2,500° F. One example of such a material is sold by the Plibrico Company, 1800 Kingsbury Street, Chicago, Ill., 60614 under the Registered Trademark of PLICAST LWI 26. Typical analysis of such a material is as follows:

| Substance | % By Weight |
| --- | --- |
| $Al_2O_3$ | 51.34 |
| $SiO_2$ | 36.85 |
| $Fe_2O_3$ | 0.95 |
| $TiO_2$ | 1.32 |
| $CaO$ | 7.13 |
| $MgO$ | 0.33 |
| Alkalies | 1.32 |

The improved method of this invention of making the valve 10 comprises the steps of providing the outer metal housing 11, forming the ceramic lining 12, supporting the lining 12 on the housing to define the flow passage 13 through the valve 10, forming the valve closure member 14, fixing the rotatable shaft 15 to the member 14, and rotatably supporting the shaft 15 on the housing 11 and associated housing components to enable rotation of the member 14 within the flow passage 13 from an open to a closed position to open and close such flow passage 13. The step of forming the member 14 comprises forming such member of ceramic material and the fixing step comprises embedding the shaft 15 substantially centrally between opposed surfaces of the member 14. In carrying out the method of this invention the steps of forming the ceramic lining 12 and forming the member 14 comprise forming each of these components of silicon carbide.

The step of forming the member 14 comprises forming such member independently of the valve 10 with a roughly cylindrical diametral opening therethrough to define the cylindrical inside surface. The embedding step comprises disposing a tubular metal sleeve 22 concentrically around the shaft 15 and connecting the sleeve 22 and shaft 15 with the key 23 to prevent relative rotation therebetween. The refractory material 24 is provided in a pourable condition and such material is poured between the sleeve 22 and the inside surface 21 whereupon the refractory material 24 is cured by subjecting the member 14, sleeve 22, key 23, and member 14 to curing environment whereby the member 14 is fixed to the sleeve 22 and hence shaft 15.

The step of forming the member 14 comprises forming such member having the plurality of angularly spaced rectilinear grooves 25 therein which extend radially outwardly from the inside surface 21. The step of pouring the pourable refractory material 24 results in the integral portions 26 of the refractory material being disposed within the rectilinear grooves 25. The integral portions 26, once cured, serve to hold the member 14 and cured refractory material together as a unitary structure.

In accordance with the method of this invention the step of forming the ceramic lining 12 comprises forming such lining independently of the housing 11 to define an outside surface thereof and the plurality of axially spaced grooves 30 in the lining which extend radially inwardly from such outside surface. The step of supporting the lining on the housing 11 preferably comprises disposing the independently formed lining in a combination mold-fixture in spaced relation from the inside surface of the metal housing 11 and concentrically with such housing. The thermally insulating material 33 is placed against the inside surface of the metal housing.

A thickness of the refractory material 31, in a pourable condition, is then poured against the exposed surface of the thermally insulating material and the outside surface of the lining whereby portions of the pourable refractory material are received within the axially spaced grooves 30. The metal housing 11, thermally insulating material 33, refractory material 31, and lining 12 define an assembly; and, the assembly (while disposed within its mold-fixture) is then subjected to a curing environment. The cured or completed assembly, thus defined, is in essence held together as a unitary structure by the refractory material 31; and, the axially spaced grooves 30 help hold the lining 12 and cured, i.e., solidified, refractory material 31 together as a unitary structure.

While present exemplary embodiments of this invention, and methods of practicing the same, have been illustrated and described it will be recognized that this invention may be otherwise variously embodied and practiced within the scope of the following claims.

What is claimed is:

1. In a butterfly valve for controlling flow therethrough of a high temperature fluid, said valve comprising an outer metal housing, a ceramic lining carried by said housing and defining a substantially right circular cylindrical fluid flow passage through said valve, a valve closure member which is a disc of substantially circular outline, a rotatable metal shaft embedded on a diametrical line of said disc, and means rotatably supporting said shaft on said housing to enable rotation of said member within said flow passage from an open to a closed position to open and close said flow passage, said member being made of a ceramic material and said shaft being embedded substantially centrally between opposed surfaces of said member, said member having a roughly cylindrical diametrical opening therethrough defining a corresponding cylindrical inside surface and further comprising a tubular metal sleeve disposed concentrically around said shaft, a key connecting said sleeve and shaft and preventing relative rotation therebetween, and a refractory material disposed between said sleeve and said inside surface fixing said member to said sleeve and shaft, said member having a plurality of angularly spaced rectilinear grooves extending radially from its inside surface and said refractory material having integral portions thereof disposed within said rectilinear grooves which help hold said member and refractory material together as a unitary structure, said lining being initially made independently of said housing and having an outside surface, a plurality of axially spaced grooves in said lining extending inwardly from said outside surface, and further comprising a thickness of refractory material disposed against said outside surface with portions thereof received within said axially spaced grooves, said portions of refractory material in said axially spaced grooves helping to hold said lining and refractory material together as a unitary structure , a thermal insulating material disposed between said thickness of refractory material and said metal housing, two sets of aligned openings in said metal housing, thermal insulating material, refractory material, and ceramic lining at diametrically opposed positions on said valve; said shaft having opposite end portions with each end portion extending through an associated set of aligned openings and outwardly of said metal housing; and a support and seal assembly for each of said end portions of said shaft, each assembly serving to support its shaft end portion while preventing leakage out of said valve of fluid flowing in said flow passage, and a tubular flange structure fixed at its inner end in sealed relation to said housing and having a planar outermost surface which is disposed perpendicular to a central longitudinal axis of said shaft, an annular groove in each of said shaft end portions, a snap ring disposed in each groove and having an outside diameter which is greater than the outside diameter of its shaft end portion thereby defining a corresponding annular portion thereof, each groove and snap ring having associated outer surfaces disposed substantially coplanar with said planar surface, a high temperature gasket covering said planar surface and said annular portion of said snap ring, said gasket having a central bore defining a right circular cylindrical surface disposed in sealed relation against the outside surface of its associated shaft end portion, an annular plate structure disposed axially outwardly of said gasket along its shaft end portion and having a gasket engaging surface sandwiching same against said planar surface, high temperature packing ring means disposed in sealed relation concentrically around and against the outside surface of its associated shaft end portion, and a spring assembly yieldingly urging said packing ring means in sealed relation against said annular plate structure.

2. A valve as set forth in claim 1 in which said annular plate structure has a tube extending outwardly in sealed relation from the side thereof opposite its gasket engaging surface; said tube being disposed concentrically around its shaft end portion and having a sealing end edge; and said spring assembly comprises; an urging disc having a central bore therethrough slightly larger in diameter than the outside diameter of its shaft end portion; a support sleeve fixed to said urging disc; said support sleeve having an inside diameter which is larger than the outside diameter of said tube whereby an end portion of said tube is received within said sleeve with said packing ring means confined by said sleeve, shaft end portion, urging disc, and sealing end edge of said tube; and a plurality of springs yieldingly urging said urging disc and hence said packing ring means in sealed engagement against said sealing end edge.

3. A valve as set forth in claim 2 in which said springs comprise mechanical compression springs.

* * * * *